United States Patent
Hirota et al.

(10) Patent No.: US 10,203,197 B2
(45) Date of Patent: Feb. 12, 2019

(54) RANGE MEASUREMENT APPARATUS AND RANGE MEASUREMENT METHOD

(71) Applicant: CANON KABUSHIKI KAISHA, Tokyo (JP)

(72) Inventors: Yuichiro Hirota, Tokyo (JP); Hisayoshi Furihata, Tokyo (JP); Yusuke Nakazato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 250 days.

(21) Appl. No.: 13/914,890

(22) Filed: Jun. 11, 2013

(65) Prior Publication Data

US 2013/0335751 A1  Dec. 19, 2013

(30) Foreign Application Priority Data

Jun. 18, 2012 (JP) .................................. 2012-137268

(51) Int. Cl.
*G01B 11/14* (2006.01)
*G01B 11/25* (2006.01)

(52) U.S. Cl.
CPC .............. *G01B 11/14* (2013.01); *G01B 11/25* (2013.01)

(58) Field of Classification Search
CPC ...................................................... G01B 11/25
See application file for complete search history.

(56) References Cited

U.S. PATENT DOCUMENTS

| | | | |
|---|---|---|---|
| 4,627,096 A * | 12/1986 | Grattoni et al. | 382/141 |
| 5,471,541 A | 11/1995 | Burtnyk et al. | |
| 5,657,047 A * | 8/1997 | Tarolli | G09G 5/393 345/671 |
| 5,721,565 A * | 2/1998 | Nguyen | G06F 3/1475 345/660 |
| 7,844,105 B2 | 11/2010 | Pfister et al. | |
| 7,844,106 B2 | 11/2010 | Pfister et al. | |
| 8,144,238 B2 | 3/2012 | Kotake et al. | |
| 8,520,930 B2 | 8/2013 | Van Coppenolle | |

(Continued)

FOREIGN PATENT DOCUMENTS

| | | |
|---|---|---|
| CN | 101295363 A | 10/2008 |
| DE | 102006022104 A1 | 11/2007 |

(Continued)

OTHER PUBLICATIONS

Vacchetti, Luca, Vincent Lepetit, and Pascal Fua. "Combining edge and texture information for real-time accurate 3d camera tracking." Mixed and Augmented Reality, 2004. ISMAR 2004. Third IEEE and ACM International Symposium on. IEEE, 2004.*

(Continued)

*Primary Examiner* — Tri Ton
*Assistant Examiner* — Rufus Phillips
(74) *Attorney, Agent, or Firm* — Venable LLP

(57) ABSTRACT

A region projected with pattern light in an image sensed by an image sensing unit which senses an image of a target object projected with pattern light is specified. Geometric features of the target object are searched for from a region other than the region projected with the pattern light in the sensed image based on the specified region. A position and orientation of the target object are derived based on the searched geometric features of the target object and geometric features of a model of the target object.

22 Claims, 10 Drawing Sheets

(56) References Cited

U.S. PATENT DOCUMENTS

| | | | |
|---|---|---|---|
| 2005/0084149 A1* | 4/2005 | Aizawa et al. | 382/154 |
| 2006/0269123 A1 | 11/2006 | Horita et al. | |
| 2010/0328682 A1* | 12/2010 | Kotake et al. | 356/620 |
| 2012/0098961 A1 | 4/2012 | Handa et al. | |
| 2012/0105868 A1 | 5/2012 | Nomura et al. | |
| 2012/0268567 A1* | 10/2012 | Nakazato et al. | 348/46 |
| 2013/0094706 A1 | 4/2013 | Nakazato | |
| 2013/0121592 A1 | 5/2013 | Fujiki et al. | |
| 2013/0245828 A1 | 9/2013 | Tateno et al. | |

FOREIGN PATENT DOCUMENTS

| | | |
|---|---|---|
| JP | 2008-046750 A | 2/2008 |
| JP | 2011-027724 A | 2/2011 |
| JP | 2011-519419 A | 7/2011 |
| WO | 2007/083039 A | 7/2007 |
| WO | 2009/127526 A1 | 10/2009 |
| WO | 2011/105522 A1 | 9/2011 |

OTHER PUBLICATIONS

Sep. 22, 2014 German Office Action concerning the corresponding German Patent Application No. 102013211240.8.

S. Iguchi et al., "Three-dimensional Image Measurement," SHOKODO, (1990), partial translation.

Z. Zhang, "A Flexible New Technique for Camera Calibration," IEEE Transactions on Pattern Analysis and Machine Intelligence, vol. 22, No. 11, pp. 1330-1334, (2000).

R. Hartley, et al., "Multiple View Geometry in Computer Vision", Second Edition, Cambridge University Press, (2003).

V. Lepetit et al., "Keypoint Recognition Using Randomized Trees", IEEE Transactions on Pattern Analysis and Machine Intelligence, vol. 28, No. 9, (2006).

W. Hoff et al., "Analysis of Head Pose Accuracy in Augmented Reality", IEEE Transactions on Visualization and Computer Graphics, vol. 6, No. 4, (Oct.-Dec. 2000).

German Office Action issued in German Application No. 102013211240.8 dated Mar. 10, 2014.

Morales et al.; "Integrated Grasp Planning and Visual Object Localization for a Humanoid Robot with Five-Fingered Hands"; IEEE/RSJ International Conference on Intelligent Robots and Systems, 2006, p. 5663-5668.

Combined Search and Examination Report under Sections 17 and 18(e) dated Dec. 10, 2013, in Great Britain Application No. 1310162.1.

Apr. 21, 2015 Chinese Office Action concerning corresponding Chinese Patent Application No. 201310239490.6.

\* cited by examiner

FIG. 3D

| POINT | x | y | z |
|---|---|---|---|
| P1 | 0 | 0 | 0 |
| P2 | 20 | 140 | 0 |
| P3 | 80 | 140 | 0 |
| P4 | 100 | 0 | 0 |
| P5 | 0 | 0 | 600 |
| P6 | 20 | 140 | 600 |
| P7 | 80 | 140 | 600 |
| P8 | 100 | 0 | 600 |

FIG. 3E

| LINE | 2 POINTS AT TWO ENDS |
|---|---|
| L1 | P1, P2 |
| L2 | P2, P3 |
| L3 | P3, P4 |
| L4 | P1, P4 |
| L5 | P2, P6 |
| L6 | P3, P7 |
| L7 | P4, P8 |
| L8 | P1, P5 |
| L9 | P5, P6 |
| L10 | P6, P7 |
| L11 | P7, P8 |
| L12 | P5, P8 |

FIG. 3F

| PLANE | SURROUNDING LINES | NORMAL (x, y, z) |
|---|---|---|
| S1 | L1, L2, L3, L4 | (0, 0, -1) |
| S2 | L1, L5, L8, L9 | (-0.88, 0.12, 0) |
| S3 | L2, L5, L6, L10 | (0, 1, 0) |
| S4 | L3, L6, L7, L11 | (0.88, 0.12, 0) |
| S5 | L4, L7, L8, L12 | (0, -1, 0) |
| S6 | L9, L10, L11, L12 | (0, 0, 1) |

RANGE MEASUREMENT APPARATUS AND RANGE MEASUREMENT METHOD

BACKGROUND OF THE INVENTION

Field of the Invention

The present invention relates to a technique for measuring a position and orientation of an object, a three-dimensional shape of which is given.

Description of the Related Art

In recent years, along with development of the robot technology, robots gradually handle complicated tasks in place of human being. A typical example of complicated tasks includes assembling of industrial products. In order to control a robot to autonomously execute an assembling task, the robot has to grip a component by an end effector such as a hand. In order to grip a component by a robot hand, a relative position and orientation between the component to be gripped and the robot have to be measured, and a moving plan has to be formulated based on the measurement results so as to actually control actuators.

In fields other than robots, positions and orientations with respect to environments and objects are required to be measured. For example, in MR (Mixed Reality), in order to composite a virtual object generated by a computer on a real image, a position and orientation have to be measured. The position/orientation measurement of a robot is executed using a camera or range sensor mounted on the robot, and a method using a two-dimensional image or range image is typically used. In the field of MR, a technique for executing position/orientation measurement of an HMD (Head Mounted Display) using an image sensed by a camera mounted on the HMD has been studied.

Patent literature 1 (Japanese Patent Application No. 2010-137680) discloses a method of precisely and quickly measuring a position and orientation of an object which moves at high speed. In this method, one viewing image obtained by sensing an image of an object projected with pattern light using a normal camera is separated into a region used for edge extraction and that used for range image generation, and edge extraction and range image generation are executed using these regions. In this manner, by complementarily using position/orientation measurement based on two-dimensional edges and that based on a range image, precision enhancement and speeding-up of the position/orientation measurement are attained.

However, with the method disclosed in patent literature 1, since some of pattern light projected regions are removed based on an edge model obtained by projecting a three-dimensional model, edges of an image can be precisely detected, but quality of a range image generated from the pattern light tends to be roughed. This phenomenon is conspicuous especially when a target object is placed to extend over a broad range in a depth direction of a viewing image, thus often causing a precision drop of the position/orientation measurement.

SUMMARY OF THE INVENTION

The present invention has been made in consideration of the aforementioned problems, and provides a technique for calculating a position and orientation of an object, especially, an object which is placed to have a spread in an image depth direction, with higher precision.

According to one aspect of the present invention, there is provided a range measurement apparatus comprising: an image sensing unit configured to sense an image of a target object projected with pattern light; a specifying unit configured to specify a region projected with the pattern light in an image sensed by the image sensing unit; a search unit configured to search for geometric features of the target object from a region other than the region projected with the pattern light in the sensed image based on the specified region; and a derivation unit configured to derive a position and an orientation of the target object based on the geometric features of the target object searched by the search unit and geometric features of a model of the target object.

According to another aspect of the present invention, there is provided a range measurement method comprising: specifying a region projected with pattern light in an image sensed by an image sensing unit configured to sense an image of a target object projected with pattern light; searching for geometric features of the target object from a region other than the region projected with the pattern light in the sensed image based on the specified region; and deriving a position and an orientation of the target object based on the geometric features of the target object searched in the searching and geometric features of a model of the target object.

Further features of the present invention will become apparent from the following description of exemplary embodiments with reference to the attached drawings.

BRIEF DESCRIPTION OF THE DRAWINGS

FIGS. 3A to 3F are views for explaining a three-dimensional geometric model;

DESCRIPTION OF THE EMBODIMENTS

Embodiments of the present invention will be described below with reference to the accompanying drawings. Note that embodiments to be described hereinafter are examples when the present invention is practiced practically and are practical embodiments of arrangements described in the scope of claims.

[First Embodiment]

Figure 1:
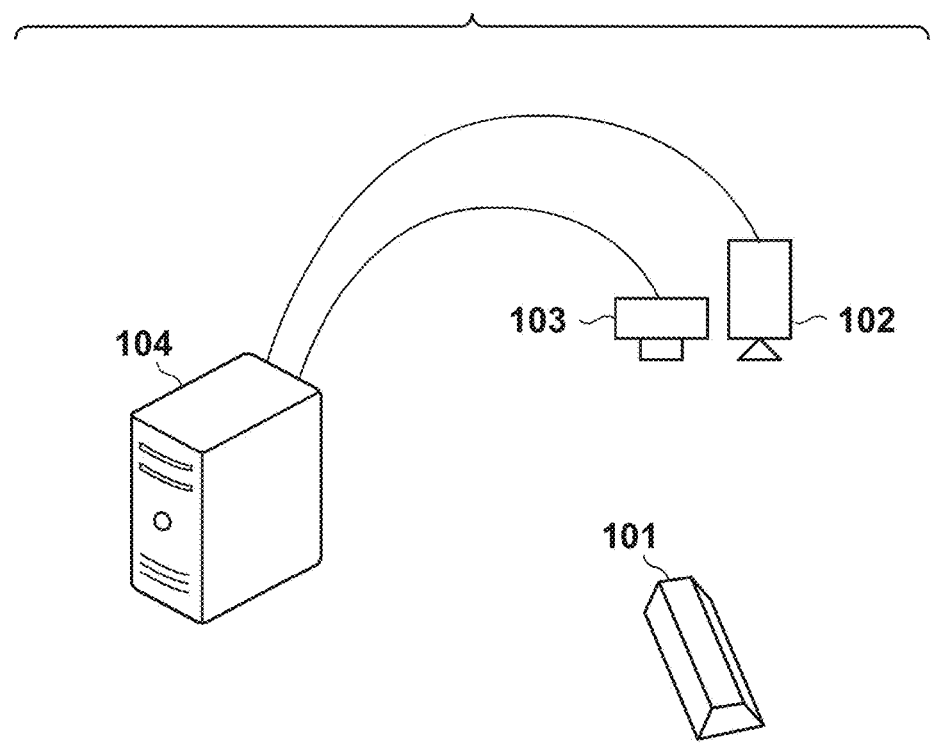
FIG. 1 is a view showing an arrangement example of a system.

The arrangement of a system according to this embodiment will be described first with reference to FIG. 1. An object 101 is a target object as an object, a position and orientation (position/orientation) of which are to be measured. In this embodiment, assume that only one object 101 as a position/orientation measurement target is placed at a certain position, as shown in FIG. 1, for the sake of simplicity. However, position/orientation measurement processing to be described below does not largely depend on shapes, the number, and placement forms of objects. For example, the present invention is applicable to a case in which the position and orientation of a certain object are to be measured in a state in which a plurality of objects having different shapes are mixed and stacked in piles.

A projector 102 irradiates the object with prescribed pattern light. In this embodiment, slit light is used as that with which the object 101 is to be irradiated. Details of the projector 102 will be described later.

An image sensing device 103 is required to sense a still image or movie on a real space, and is used to sense an image of the object 101 irradiated with slit light by the projector 102. Then, the image sensing device 103 outputs an image sensed by itself (sensed image or viewing image) to an image processing apparatus 104. Details of the image sensing device 103 will be described later.

The image processing apparatus 104 executes operation control of the projector 102 and image sensing device 103, and calculates a position and orientation of the object 101 using the sensed image obtained from the image sensing device 103.

Figure 2:
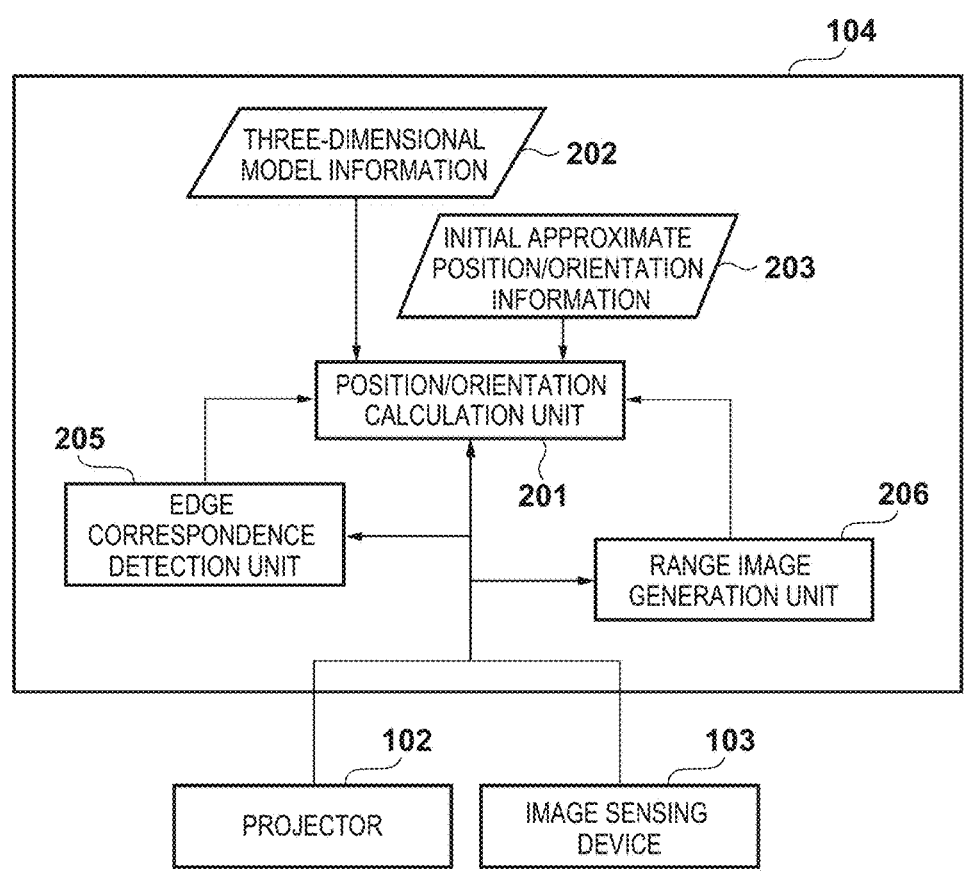
FIG. 2 is a block diagram showing a functional arrangement example of an image processing apparatus 104.

A functional arrangement example of the image processing apparatus 104 will be described below with reference to the block diagram shown in FIG. 2.

A position/orientation calculation unit 201 calculates a position and orientation of the object 101 using processing results of an edge correspondence detection unit 205 and range image generation unit 206 based on the image sensed by the image sensing device 103. Then, the position/orientation calculation unit 201 outputs the calculated position and orientation of the object 101 to an appropriate output destination.

Three-dimensional model information 202 is obtained by converting a CAD model itself or three-dimensional CAD model, which can be handled by three-dimensional CAD software, into a plurality of polygon elements used in Computer Graphics field. In this embodiment, a three-dimensional geometric model which simulates the shape of the object 101 and is configured by polygon elements is used. The three-dimensional geometric model configured by polygon elements will be described below with reference to FIGS. 3A to 3F.

Figure 3A:
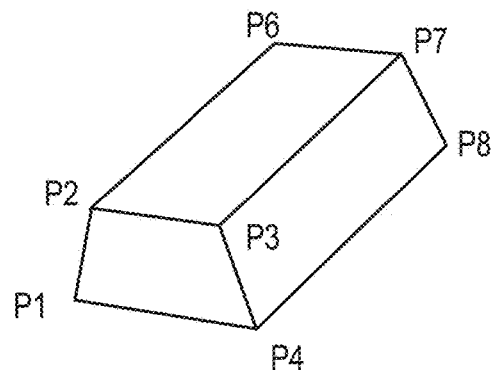
Figure 3B:
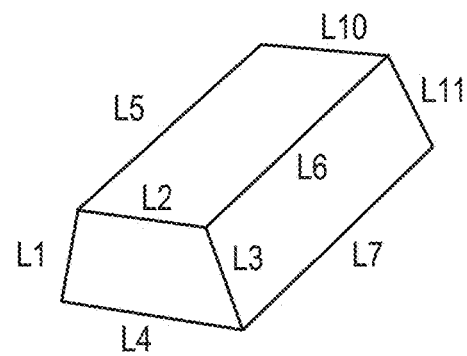
Figure 3C:
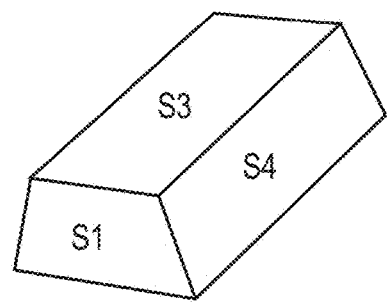

The three-dimensional geometric model configured by polygon elements includes elements such as points, lines, and planes, as shown in FIGS. 3A to 3F. FIGS. 3A to 3C show an identical three-dimensional geometric model.

Model information of the three-dimensional geometric model configured by polygon elements manages, in association with vertices of the three-dimensional geometric model exemplified in FIG. 3A, indices of the respective vertices and their three-dimensional coordinate values, as shown in FIG. 3D.

Also, this model information manages, in association with respective sides of the three-dimensional geometric model exemplified in FIG. 3B, indices of the respective sides and those of vertices at two ends of each side, as shown in FIG. 3E.

Furthermore, this model information manages, in association with respective planes (polygons) of the three-dimensional geometric model exemplified in FIG. 3C, indices of the respective polygons, those of respective sides of each polygon, and normal vectors of the polygons, as shown in FIG. 3F.

Such three-dimensional model information 202 is stored in an appropriate memory in the image processing apparatus 104 or an external memory accessible by the image processing apparatus 104.

Initial approximate position/orientation information 203 is given as initial values of iterative calculations required to calculate the position and orientation of the object 101. As this initial approximate position/orientation information 203, appropriate values are set in advance, and are stored in an appropriate memory in the image processing apparatus 104 or an external memory accessible by the image processing apparatus 104. This initial approximate position/orientation information 203 may be set by the user using an operation unit (not shown).

Assume that the position and orientation are those on a coordinate system (camera coordinate system) with reference to those of the image sensing device 103 unless otherwise specified. Also, assume that "coordinate system of object" in the following description indicates a coordinate system which is locally set for each object.

The edge correspondence detection unit 205 detects corresponding edges between the three-dimensional geometric model projected onto an image sensed by the image sensing device 103 and the image of the object 101 included in the sensed image.

The range image generation unit 206 generates, from the image sensed by the image sensing device 103, a range image which represents distances from the image sensing device 103 to respective positions on the object 101 for respective pixels. In this embodiment, distances are calculated by triangulation using multi-slit light as pattern light in association with generation of the range image. However, the pattern light is not limited to this, and other patterns may be used as long as a plurality of times of image sensing operations are not required. For example, a random dot pattern or local plane pattern may be used. Alternatively, spot light may be used. As for a region on which no illumination for range measurement is projected, special light is not projected when sufficient brightness can be obtained by environmental light. Otherwise, an illumination pattern is changed to project, for example, uniform white light. Also, in a pattern projection method, a projected region may be reversed to express a pattern as shadows.

The projector 102 is a liquid crystal projector, and is a projection device which projects slit light as prescribed pattern light. Intrinsic parameters (focal length, principal point position, and lens distortion parameters) of the projector are calibrated in advance by, for example, a method disclosed in the following literature.

Z. Zhang, "A flexible new technique for camera calibration," IEEE Transactions on Pattern Analysis and Machine Intelligence, vol. 22, no. 11, pp. 1330-1334, 2000

Note that a device other than the projector 102 may be used as long as it can project slit light. For example, a projector using a DMD (Digital Mirror Device) or LCOS may be used.

The intrinsic parameters (focal length, principal point position, and lens distortion parameters) of the image sensing device 103 are calibrated in advance by, for example, the aforementioned Zhang's method. Furthermore, the relative position and orientation between the image sensing device 103 and projector 102 are calibrated in advance by, for example, the aforementioned Zhang's method or a method disclosed in the following literature, thus allowing triangulation using pattern light.

Seiji Iguchi and Kosuke Sato, "Three-dimensional Image Measurement" (SHOKODO, 1990)

Figure 4:
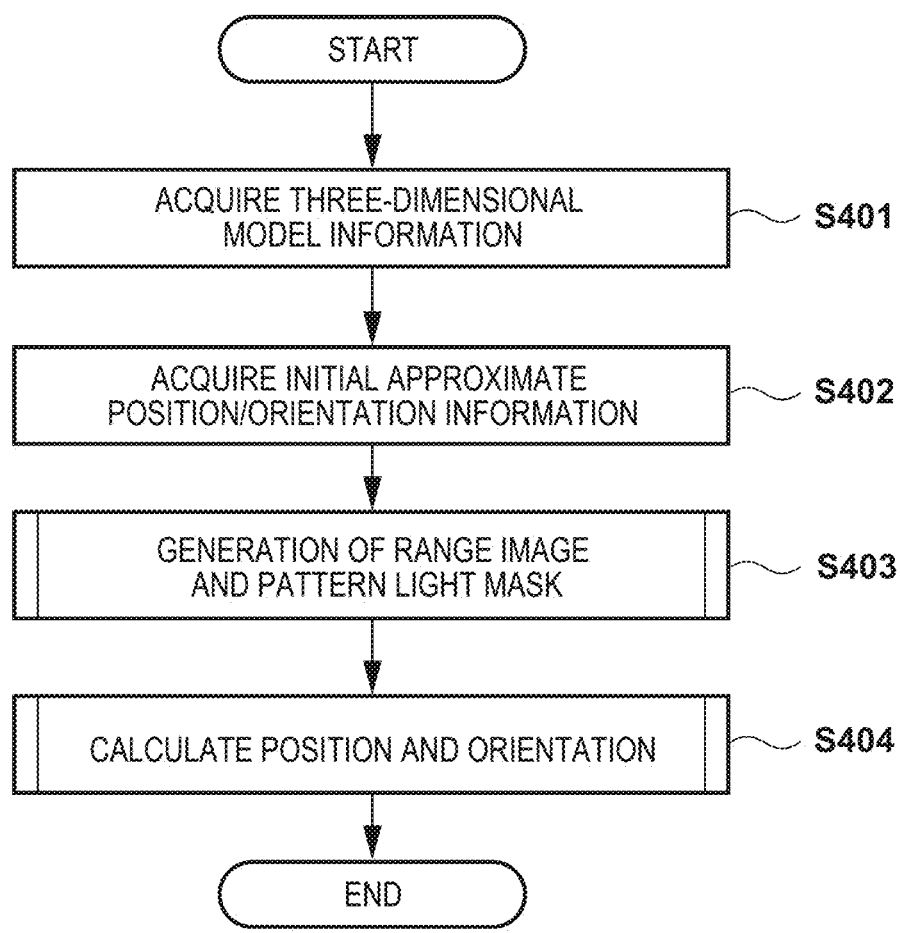
FIG. 4 is a flowchart of processing to be executed by the image processing apparatus 104.

Processing executed by the image processing apparatus 104 to calculate the position and orientation of the object 101 will be described below with reference to FIG. 4 which shows the flowchart of that processing.

In step S401, the position/orientation calculation unit 201 reads out the three-dimensional model information 202 from an internal or external memory of the image processing apparatus 104. Note that the position/orientation calculation unit 201 may acquire the three-dimensional model information 202 input by the user by operating an operation unit (not shown). Alternatively, a plurality of pieces of three-dimensional model information 202 of a plurality of three-dimensional geometric models may be stored in the memory, an object included in an image sensed by the image sensing device 103 may be recognized, and three-dimensional model information 202 corresponding to the recognized object may be read out.

Next, in step S402, the position/orientation calculation unit 201 reads out the initial approximate position/orientation information 203 from the internal or external memory of the image processing apparatus 104. Note that the position/orientation calculation unit 201 may acquire the initial approximate position/orientation information 203 input by the user by operating an operation unit (not shown). Alternatively, the initial approximate position/orientation information 203 may be decided and acquired by an optical sensor which measures the position and orientation by sensing markers laid out on the object using a camera fixed to a scene. In addition, arbitrary sensors may be used as long as they measure a position and orientation of six degrees of freedom. Also when an approximate position and orientation where the object is placed are known in advance, these values may be used as the initial approximate position/orientation information 203.

Next, in step S403, the edge correspondence detection unit 205 and range image generation unit 206 respectively generate a pattern light mask and range image based on the image sensed by the image sensing device 103. Details of the processing in step S403 will be described later with reference to the flowchart shown in FIG. 5.

Next, in step S404, the position/orientation calculation unit 201, the edge correspondence detection unit 205, or a control unit (not shown) settles the position and orientation of the three-dimensional geometric model of the object 101 based on the respective pieces of information obtained in steps S401 to S403. Thus, the position and orientation are calculated as those of the object 101.

Figure 5:
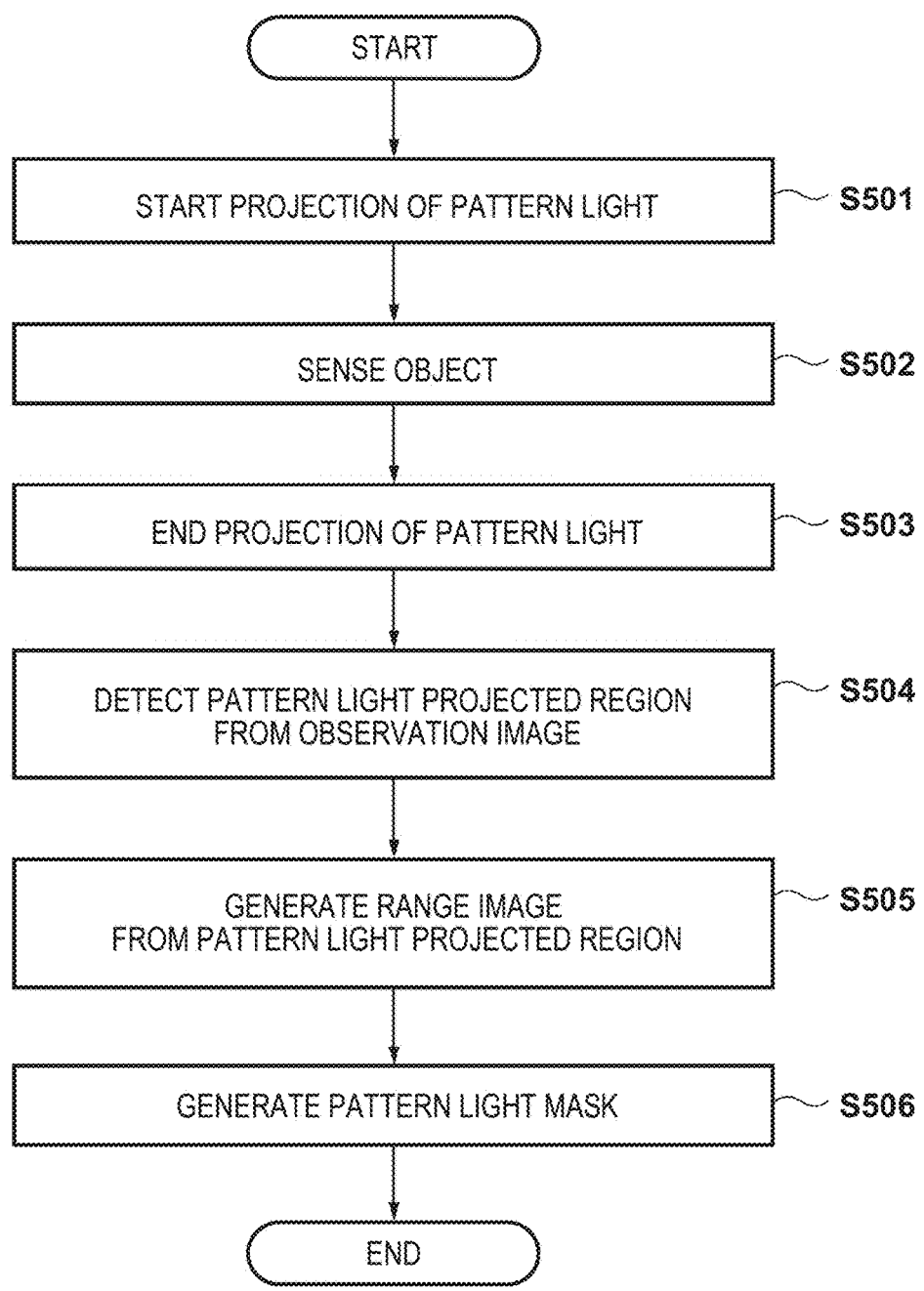
FIG. 5 is a flowchart showing details of processing in step S403.

Details of the processing in step S403 above will be described below with reference to FIG. 5 which shows the flowchart of that processing.

In step S501, the control unit (not shown) controls the projector 102 to irradiate the object 101 with slit light as the prescribed pattern light.

Figure 6:
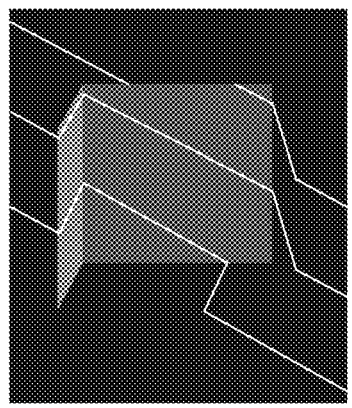
FIG. 6 is a view showing an example of a sensed image.

In step S502, the control unit (not shown) controls the image sensing device 103 to sense an image of the object 101 irradiated with the prescribed pattern light. FIG. 6 shows an example of a sensed image by the image sensing device 103. The following description will be given under the assumption that the image sensed by the image sensing device 103 is that exemplified in FIG. 6 for the sake of simplicity.

In step S503, the control unit (not shown) controls the projector 102 to end irradiation of the slit light as the prescribed pattern light.

In step S504, the edge correspondence detection unit 205 detects regions with the pattern light in the sensed image as pattern light projected regions, and generates a binary image which has the same vertical and horizontal sizes as those of the sensed image, and expresses the pattern light projected regions and a non-pattern light projected region using different pixel values. The binary image is generated as follows.

That is, a luminance value at each pixel position in the sensed image is referred to, and when a luminance value at the referred pixel position (x, y) is not less than a threshold, it is judged that the pixel position belongs to a pattern light projected region, and a pixel value at the pixel position (x, y) in the binary image is set to be "1". On the other hand, if the luminance value at the pixel position (x, y) in the sensed image is less than the threshold, it is judged that the pixel position does not belong to the pattern light projected region, and a pixel value of the pixel position (x, y) in the binary image is set to be "0". Note that meanings of "1" and "0" may be reversed, and the present invention is not limited to these values. That is, whether or not a pixel at each pixel position in the binary image is located at a pixel position which belongs to the pattern light projected region need only be discriminated by a pixel value.

Whether or not a pixel at each pixel position in the sensed image belongs to the pattern light projected region may be judged by various other methods in addition to comparison between the luminance value and threshold, as described above. For example, such judgment can be conducted by a method of making such discrimination based on component information of a color of the slit light and that of a color of each pixel in the sensed image, or a method of making such discrimination based on the way color information changes.

Figure 7:
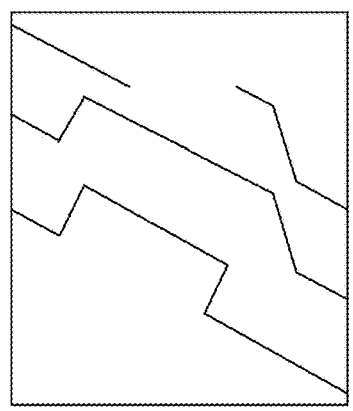
FIG. 7 is a view showing an example of a binary image.

FIG. 7 shows an example of a binary image generated from the sensed image shown in FIG. 6. Regions with the pattern light projected regions in the sensed image shown in FIG. 6 are indicated by black lines in FIG. 7, and these black lines are formed by pixels with a pixel value "1" (a region other than the black line is formed by pixels with a pixel value "0").

Next, in step S505, the range image generation unit 206 generates a range image using the binary image generated in step S504. A distance as a pixel value of each pixel of the range image can be calculated according to a method described in the following literature.

R. Hartley and A. Zisserman "Multiple view geometry in computer vision Second Edition" (Cambridge University Press, 2003)

In this embodiment, distances are calculated based on pixel positions in the pattern light projected by the projector 102, corresponding positions on the sensed image, the intrinsic parameters of the projector 102 and image sensing device 103, and the relative position and orientation between the projector 102 and image sensing device 103. Then, visual line vectors corresponding to respective pixel positions of the sensed image are multiplied by the distances of these pixel positions, thus calculating positions (three-dimensional positions on the camera coordinate system) as pointing destinations of the visual line vectors which pass through the respective pixel positions of the sensed image as point group data.

In step S506, the edge correspondence detection unit 205 generates an image obtained by changing the binary image, that is, by enlarging regions with a pixel value "1" in the binary images as a pattern light mask (having the same vertical and horizontal sizes as those of the binary image).

Initially, a pattern light mask is generated as a copy of the binary image. Then, a pixel position in the pattern light mask is referred to, and when a pixel value of a pixel at the referred pixel position (x, y) is "1", pixel values of neighboring pixels (for example, pixels which neighbor a pixel of interest) of the pixel of interest are updated to "1".

Figure 8:
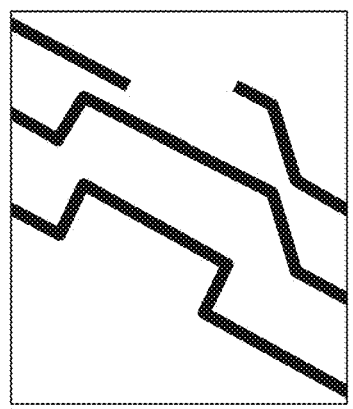
FIG. 8 is a view showing an example of a pattern light mask.

FIG. 8 shows an example of the pattern light mask generated from the binary image shown in FIG. 7. The pattern light projected regions (formed by pixels of a pixel value "1") in the binary image shown in FIG. 7 are enlarged to thicker black lines in FIG. 8, and the enlarged black lines are formed by pixels with a pixel value "1" (a region other than the enlarged black lines is formed by pixels with a pixel value "0").

This pattern light mask is used to calculate deviations (errors) of edges between the three-dimensional geometric model on the sensed image and the object 101 in position/orientation calculation processing later. The reason why the pattern light projected regions are enlarged is to reduce a risk of correspondence errors between edges of the three-dimensional geometric model and those formed by pattern light projection. This association will be described in detail later.

Figure 9:
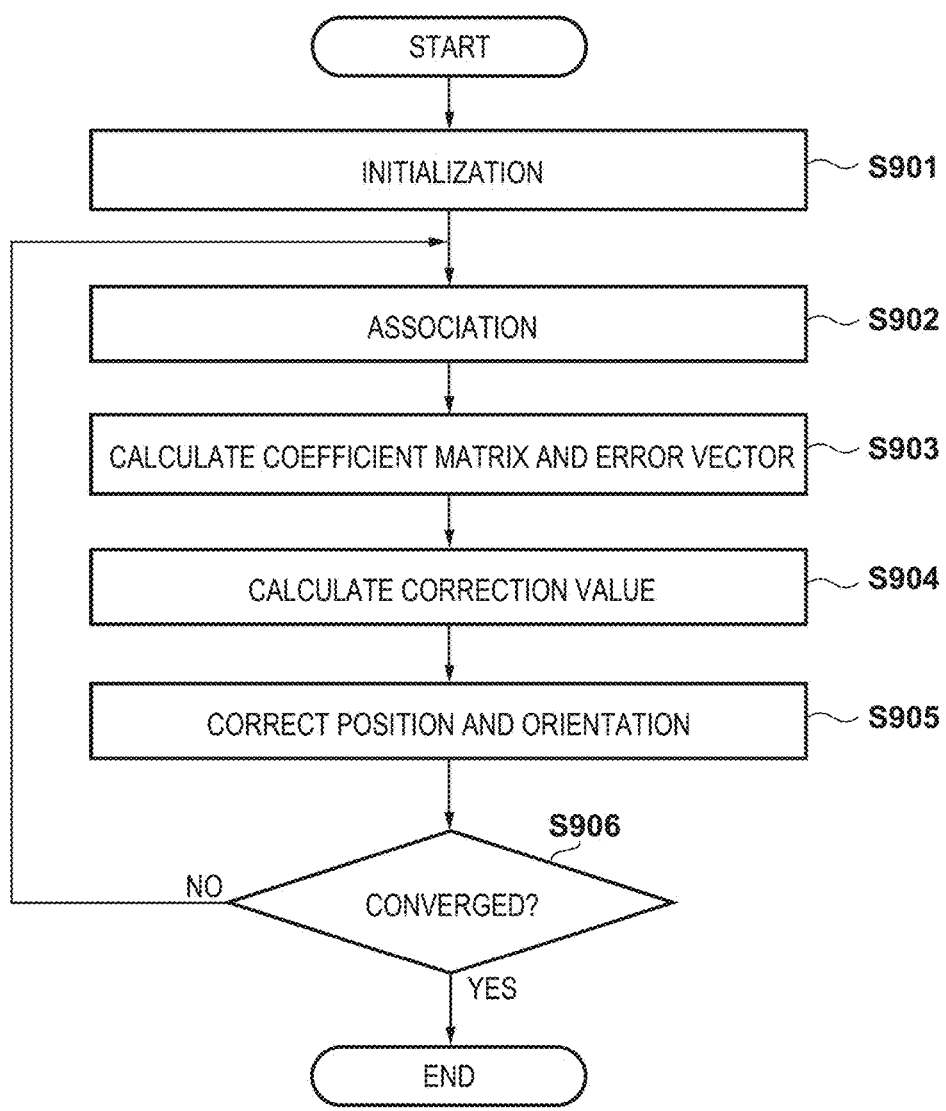
FIG. 9 is a flowchart showing details of processing in step S404.

Next, details of the processing in step S404 will be described below with reference to FIG. 9 which shows the flowchart of that processing. In this embodiment, a Gauss-Newton method is used in iterative calculations required to settle the position and orientation of the object 101. Thus, approximate values of the position and orientation (expressed by "s" in the following description) of the object 101 are iteratively corrected by the iterative calculations, thereby calculating the position and orientation.

In the calculations of the position and orientation in this embodiment, an estimated position and orientation are optimized as follows. That is, the estimated position and orientation are optimized by minimizing a sum total of distances between the edges of the object 101 on the sensed image and line segments of the three-dimensional geometric model projected onto that image based on the estimated position and orientation and distances between respective positions indicated by the point group data and the three-dimensional geometric model at the estimated position and orientation. More specifically, signed distances between points and lines on a two-dimensional image and signed distances between points and plane on a three-dimensional space are expressed as linear functions of minimal changes in position and orientation of the object 101 by linear Taylor expansion. Then, by writing and solving linear simultaneous equations associated with minimal changes in position and orientation so that signed distances become zero, the minimal changes in position and orientation of the object 101 are calculated to repetitively correct the position and orientation.

In step S901, the position/orientation calculation unit 201 sets the above initial approximate position/orientation information 203 to be initial values (initial position and orientation s) of the following iterative calculations.

In step S902, the edge correspondence detection unit 205 projects a three-dimensional geometric model (only sides in practice) having a position and orientation indicated by the current values s onto the sensed image. Furthermore, the position/orientation calculation unit 201 converts, in association with respective planes which form the three-dimensional geometric model, coordinate values of respective vertices of the planes into those on the camera coordinate system.

Figure 10A:
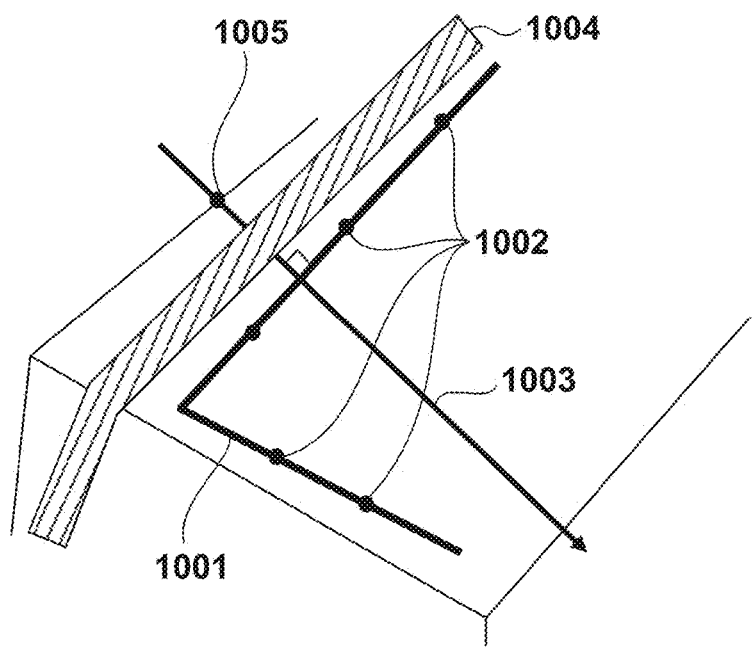
FIGS. 10A and 10B are views for explaining association processing.

Then, the edge correspondence detection unit 205 associates edges between the object 101 in the sensed image and the three-dimensional geometric model projected onto the sensed image. This association processing will be described below with reference to FIGS. 10A and 10B. In FIG. 10A, a region in the sensed image corresponding to a region in which a pixel value is "1" in the pattern light mask is expressed as a pattern light mask 1004.

A line segment obtained by projecting a line segment of the three-dimensional geometric model having the position and orientation indicated by the current values s is shown as a line segment 1001. A projected image of the line segment is also a line segment on the image. Next, control points 1002 are set on the projected line segment 1001 to have equal intervals on the image, and a search line 1003 is set in a normal direction to the projected line segment 1001 for each control point 1002. Then, for each control point 1002, a one-dimensional edge is detected on a line which is located within a prescribed distance from that control point on the search line 1003 set for that control point, and does not include the pattern light mask 1004. Then, a point closest to the control point 1002 of detected edges is held as a corresponding point 1005. In practice, although the pattern light mask 1004 includes edges formed by the pattern light, since a corresponding point is searched in this way, an edge formed by the pattern light can be avoided from being erroneously associated.

Figure 10B:
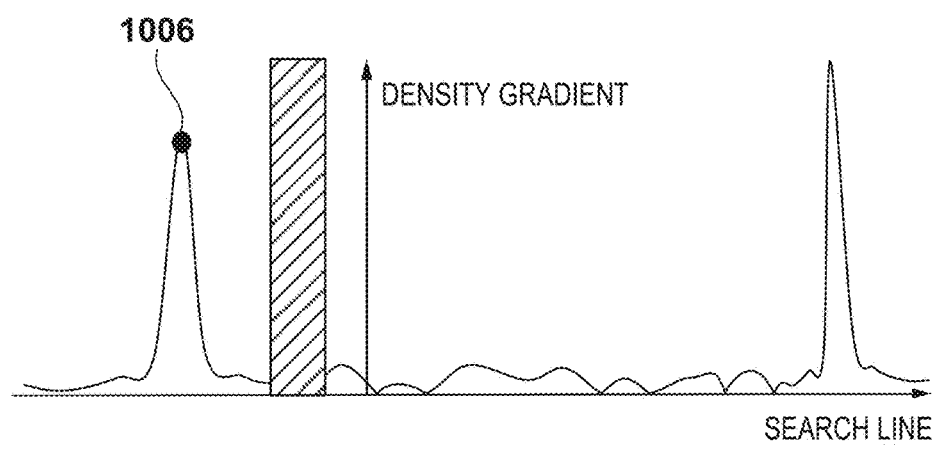

FIG. 10B shows a graph in which an origin is a control point, the abscissa plots search lines, and the ordinate plots absolute values of a luminance gradient. In the previous image, an edge is detected as an extreme value of an absolute value of a luminance gradient of a pixel value. In this case, a point at which the extreme value of the absolute value of the luminance gradient is larger than a predetermined value and which is closest to the control point is detected as a corresponding point 1006 (the corresponding point 1005 in FIG. 10A).

Note that upon detection of an edge which does not result from the pattern light, an edge is detected in a region other than the pattern light mask 1004 in this embodiment. However, the processing order at this time may be the following order to obtain the same effect. That is, after an edge is detected, whether or not the detected edge is located within a mask region is discriminated. If the detected edge is located within the mask region, that edge is adopted; if it is located outside the region, the next edge is detected.

In step S903, the position/orientation calculation unit 201 calculates a coefficient matrix required to calculate the position and orientation (required to solve linear simultaneous equations) and error vectors. In order to associate a line segment as a side of the three-dimensional geometric model with an edge and to calculate the position and orientation of the object 101, the coefficient matrix required to calculate the position and orientation and error vectors have to be calculated.

Note that elements of the coefficient matrix are linear partial differential coefficients for minimal changes in approximate values of the position and orientation. As for edges, partial differential coefficients of image coordinates are calculated, and as for a point group, partial differential coefficients of three-dimensional coordinates are calculated. Each error vector is a distance between the projected line segment and detected edge on the image in association with that edge, and is a distance between a plane and point of a model on the three-dimensional space in association with the point group data.

Figure 11:
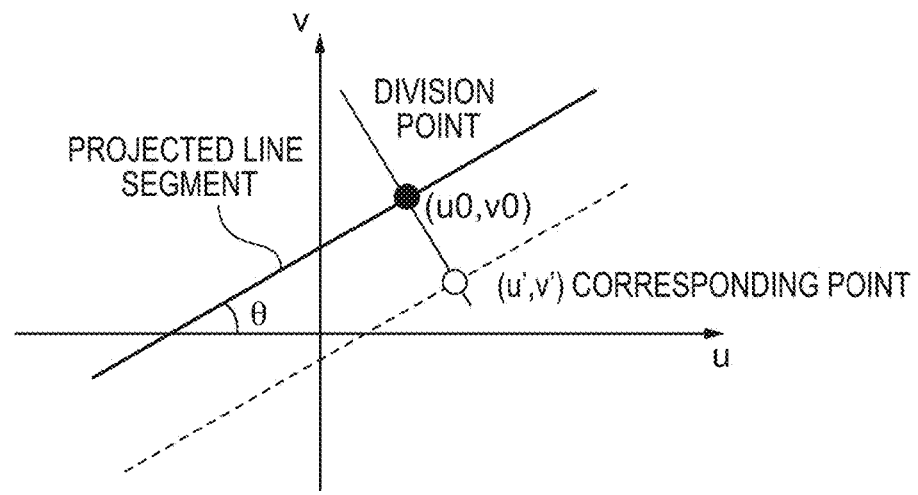
FIG. 11 is a view for explaining the relationship between a projected image of a line segment and a detected edge.

FIG. 11 is a view for explaining a projected image of a line segment and detected edge. In FIG. 11, horizontal and vertical directions of an image are respectively expressed as u and v axes. Coordinates of a certain control point (a point which equally divides each projected line segment on the image) on the image are expressed by (u0, v0), and a tilt of the line segment to which the control point belongs on the image is expressed as a tilt θ with respect to the u axis. The tilt θ is calculated as a tilt of a line which couples coordinates of two ends on the image by projecting three-dimensional coordinates of the two ends of the line segment. A normal vector to the line segment on the image is expressed by (sin θ, −cos θ). Also, coordinates of a corresponding point of the control point on the image are expressed by (u', v'). A point (u, v) on a line (a broken line in FIG. 11) which passes through the coordinates (u', v') of the corresponding point and has a tile θ can be expressed by:

u sin θ−v cos θ=d d=u' sin θ−v' cos θ     (1)

The position of the control point on the image changes depending on the position and orientation of the object 101. Degrees of freedom of the position and orientation of the object 101 are six degrees of freedom. That is, s is a six-dimensional vector, which includes three elements representing the position of the object 101 and three elements representing the orientation. The three elements which represent the orientation are expressed by, for example, Euler angles or a three-dimensional vector in which a direction represents a rotation axis that passes through an origin, and norms represent rotation angles. The coordinates (u, v) of the point which changes depending on the position and orientation on the image can be approximated by linear Taylor expansion in the vicinity of coordinates (u0, v0) like:

$$u \approx u_0 + \sum_{i=1}^{6} \frac{\partial u}{\partial s_i} \Delta s_i \quad (2)$$

$$v \approx v_0 + \sum_{i=1}^{6} \frac{\partial v}{\partial s_i} \Delta s_i$$

where $\Delta s_i$ (i=1, 2, . . . , 6) is a minimal change of each component of s.

It is assumable that a position of a control point obtained by the correct values s on the image is located on the line given by equation (1). Substitution of u and v approximated by expressions (2) into equation (1) yields:

$$\sin\theta \sum_{i=1}^{6} \frac{\partial u}{\partial s_i} \Delta s_i - \cos\theta \sum_{i=1}^{6} \frac{\partial v}{\partial s_i} \Delta s_i = d - r \quad (3)$$

$$r = u_0 \sin\theta - v_0 \cos\theta$$

Three-dimensional coordinates on the camera coordinate system can be converted into three-dimensional coordinates (x, y, z) on the coordinate system of the object 101 using the position and orientation s of the object 101. Assume that a certain point is converted into a point (x0, y0, z0) on the coordinate system of the object 101 based on the approximate position and orientation. The coordinates (x, y, z) change depending on the position and orientation of the object 101, and can be approximated by linear Taylor expansion in the vicinity of the point (X0, y0, z0) like:

$$x \approx x_0 + \sum_{i=1}^{6} \frac{\partial x}{\partial s_i} \Delta s_i \quad (4)$$

$$y \approx y_0 + \sum_{i=1}^{6} \frac{\partial y}{\partial s_i} \Delta s_i$$

$$z \approx z_0 + \sum_{i=1}^{6} \frac{\partial z}{\partial s_i} \Delta s_i$$

Assume that an equation of a plane of the three-dimensional model which is associated with a position indicated by certain data in the point group data on the coordinate system of the object 101 in step S902 is given by ax+by+cz=e (a2+b2+c2=1, a, b, c, and e are constants). Also, assume that the coordinates (x, y, z) converted using the correct values s satisfy the equation ax+by+cz=e (a2+b2+c2=1) of the two-dimensional plane. When expressions (4) above are substituted in the equation of the plane, we have:

$$a \sum_{i=1}^{6} \frac{\partial x}{\partial s_i} \Delta s_i + b \sum_{i=1}^{6} \frac{\partial y}{\partial s_i} \Delta s_i + c \sum_{i=1}^{6} \frac{\partial z}{\partial s_i} \Delta s_i = e - q \quad (5)$$

$$q = ax_0 + by_0 + cz_0$$

In this embodiment, as described above, an error value on the three-dimensional space is expressed by a distance between a plane of the three-dimensional geometric model and a corresponding measurement point (equation (5)). However, the definition method of the error value is not limited to this, and any other methods may be used as long as they can define distances (deviation amounts) between the three-dimensional geometric model and point group data. For example, when the point group data includes line information and plane information, if an error value is defined using an inter-edge distance or inter-plane distance, the position and orientation can be similarly calculated.

Equation (3) can be true for all associated edges. Also, since equation (5) is true for all associated point group data, linear simultaneous equations associated with $\Delta s_i$ hold, as given by:

$$\begin{bmatrix} \sin\theta_1 \frac{\partial u_1}{\partial s_1} - \cos\theta_1 \frac{\partial v_1}{\partial s_1} & \sin\theta_1 \frac{\partial u_1}{\partial s_2} - \cos\theta_1 \frac{\partial v_1}{\partial s_2} & \cdots & \sin\theta_1 \frac{\partial u_1}{\partial s_6} - \cos\theta_1 \frac{\partial v_1}{\partial s_6} \\ \sin\theta_2 \frac{\partial u_2}{\partial s_1} - \cos\theta_1 \frac{\partial v_2}{\partial s_1} & \sin\theta_2 \frac{\partial u_2}{\partial s_2} - \cos\theta_1 \frac{\partial v_2}{\partial s_2} & \cdots & \sin\theta_2 \frac{\partial u_2}{\partial s_6} - \cos\theta_1 \frac{\partial v_2}{\partial s_6} \\ \vdots & \vdots & \ddots & \vdots \\ a_1 \frac{\partial x_1}{\partial s_1} + b_1 \frac{\partial y_1}{\partial s_1} + c_1 \frac{\partial z_1}{\partial s_1} & a_1 \frac{\partial x_1}{\partial s_2} + b_1 \frac{\partial y_1}{\partial s_2} + c_1 \frac{\partial z_1}{\partial s_2} & \cdots & a_1 \frac{\partial x_1}{\partial s_6} + b_1 \frac{\partial y_1}{\partial s_6} + c_1 \frac{\partial z_1}{\partial s_6} \\ a_2 \frac{\partial x_2}{\partial s_1} + b_2 \frac{\partial y_2}{\partial s_1} + c_2 \frac{\partial z_2}{\partial s_1} & a_2 \frac{\partial x_2}{\partial s_2} + b_2 \frac{\partial y_2}{\partial s_2} + c_2 \frac{\partial z_2}{\partial s_2} & \cdots & a_2 \frac{\partial x_2}{\partial s_6} + b_2 \frac{\partial y_2}{\partial s_6} + c_2 \frac{\partial z_2}{\partial s_6} \\ \vdots & \vdots & \vdots & \vdots \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} d_1 - r_1 \\ d_2 - r_2 \\ \vdots \\ e_1 - q_1 \\ e_2 - q_2 \\ \vdots \end{bmatrix} \quad (6)$$

Note that equations (6) are expressed as:

$$J\Delta s = E \quad (7)$$

Partial differential coefficients required to calculate a coefficient matrix J of linear simultaneous equations (6) are calculated according to, for example, a method disclosed in the following literature:

V. Lepetit and P. Fua, "Keypoint recognition using randomized trees," IEEE Transactions on Pattern Analysis and Machine Intelligence, vol. 28, no. 9, 2006.

In step S904, the position/orientation calculation unit 201 calculates partial differential coefficients required to calculate the coefficient matrix J of the linear simultaneous equations. Based on equation (7), the position/orientation calculation unit 201 calculates a position/orientation correction value Δs using a generalized inverse matrix $(J^T \cdot J)^{-1} \cdot J^T$ of the matrix J. However, since edges and point group data include many outliers due to detection errors, a robust estimation method to be described below is used. In general, at an edge (point group data) as an outlier, an error d−r(e−q) becomes large. Hence, such edge has a large degree of contribution to simultaneous equations of equations (6) and (7), and the precision of Δs consequently lowers.

Hence, a small weight is given to data with a large error d−r(e−q), and a large weight is given to data with a small error d−r(e−q). The weight is given using a Tukey function, as given by:

$$w(d-r) = \begin{cases} (1-((d-r)/c_1)^2)^2 & |d-r| \le c_1 \\ 0 & |d-r| > c_1 \end{cases} \quad (8)$$

$$w(e-q) = \begin{cases} (1-((e-q)/c_2)^2)^2 & |e-q| \le c_2 \\ 0 & |e-q| > c_2 \end{cases}$$

where $c_1$ and $c_2$ are constants. Note that the function used to give a weight need not be the Tukey function, and any other functions such as a Huber function may be used as long as they give a small weight to information with a large error, and a large weight to information with a small error. Let $w_i$ be a weight corresponding to each measurement information (edge or point group data). Note that a weight matrix W is defined by:

$$W = \begin{bmatrix} w_1 & & & 0 \\ & w_2 & & \\ & & \ddots & \\ 0 & & & w_{N_c} \end{bmatrix} \quad (9)$$

The weight matrix W is a square matrix which includes all "0"s other than diagonal components, which include weights $w_i$. Using this weight matrix W, equation (7) is deformed like:

$$WJ\Delta s = WE \quad (10)$$

The correction value Δs is calculated by solving equation (10) like:

$$\Delta s = (J^T W J)^{-1} J^T W E \quad (11)$$

In step S905, the position/orientation calculation unit 201 corrects (updates) the position/orientation approximate values s by calculating, using the position/orientation correction value Δs calculated in step S904:

$$s \leftarrow s + \Delta s$$

In step S906, the position/orientation calculation unit 201 makes convergence determination of s. If s is converged, the processing ends; otherwise, the process returns to step S902 to continue iterative calculations. In the convergence determination, convergence is determined when the correction value Δs is nearly zero or when square sums of error vectors are nearly the same before and after correction. In this way, the position and orientation can be calculated by iteratively making calculations until convergence.

As described above, according to this embodiment, the position/orientation measurement can be made to have higher stability with respect to a surface shape and geometric shape of an object, and to have high precision especially for an object which is laid out to have a spread in an image depth direction.

Note that this embodiment has explained the calculation method using the Gauss-Newton method as an example of model fitting. The model fitting method is not limited to this. For example, calculations may be made using a Levenberg-Marquardt method that can attain more robust calculations or using a steepest descent method as a simpler method. Also, other nonlinear optimization calculation methods such as a conjugate gradient method and ICCG method may be used.

Furthermore, in this embodiment, the position and orientation of the object 101 are calculated in step S404 by model fitting with iterative calculations using the range image and pattern light mask obtained in step S403. However, a method of directly calculating the position and orientation using pattern matching in place of model fitting in step S404 may be used.

For example, a Geodesic Sphere having equal distances from the center of a CAD model to vertices is set as CAD data of an object. Then, edge images when viewed from respective vertices of the Geodesic Sphere to the center of the CAD model are prepared in advance, and pattern matching between these viewpoint-dependent edge models and a sensed image which has already undergone the pattern light mask processing is executed. In this way, an approximate position and orientation of the object can be calculated while suppressing the influence of pattern light noise. Furthermore, the use application of the range image and pattern light mask obtained in step S403 is not limited to use in model fitting and pattern matching. For example, the range image and pattern light mask are widely applicable to general collation processing that eliminates the influence of pattern light noise using the pattern light mask.

Note that in this embodiment, the image processing apparatus 104 directly acquires a sensed image from the image sensing device 103. However, the present invention is not limited to this. For example, the image processing apparatus 104 may acquire a sensed image from a memory which stores images sensed by the image sensing device 103. In this case, the image sensing device 103 need not always be connected to the image processing apparatus 104.

That is, the image processing apparatus 104 according to the first embodiment and the following embodiments is merely an example of the following arrangement, and various modifications of the arrangement are applicable as long as they have functions equivalent to the following arrangement.

That is, an image including a target object projected with pattern light is acquired. Then, model information which simulates a shape of the target object is superimposed on the image, points of the target object, which correspond to those of the superimposed model information, are specified from a region other than an enlarged region obtained by enlarging a region with the pattern light in the image. Then, based on the specified points, positional deviations between the model information superimposed on the image and the target object are calculated. Then, the position and orientation of the model information are calculated as those of the target object so as to minimize the positional deviations.

In the above search, a region with pattern light in the sensed image is defined as a pattern light region, and a region without any pattern light in the sensed image is defined as a non-pattern light region. A mask image having different pixel values in a region in the mask image corresponding to the pattern light region and that in the mask image corresponding to the non-pattern light region is generated, and a region in the sensed image corresponding to a region obtained by enlarging the region in the mask image corresponding to the pattern light region is defined as an enlarged region. Then, the search results in a region other than the enlarged region are defined as "corresponding points of the target object". Alternatively, results obtained by excluding positions in the enlarged region from the search results are defined as "corresponding points of the target object".

In the above calculations, a range image which has distances from the image sensing device to respective positions on the target object as pixel values is generated from the mask image. Then, the iterative calculations are made to minimize positional deviations between respective positions on the target object expressed by the range image and those corresponding to these positions on the model information, and the distances.

[Second Embodiment]

The first embodiment has explained the method of detecting pattern light projected regions from a sensed image, and generating a pattern light mask based on the detected regions in step S506. This method is widely applicable even when a shape of pattern light is unknown. As another method, when the shape of the pattern light is given, projected regions of the pattern light in the sensed image are calculated from this pattern light shape, an approximate position and orientation of an object, and a geometric shape of the object, thus generating a pattern light mask.

Based on light source information in a state in which a projector projects pattern light and model information of an object laid out at an approximate position and orientation, a specific pixel onto which a camera slit light which senses an image is projected is calculated. More specifically, such pixels are calculated by the principle of a ray tracing method which traces and calculates which positions on an image sensor of the camera rays irradiated from a slit light source reach via collision on an object surface. Thus, information equivalent to a bitmap (FIG. 7) which is generated in step S504 and indicates the pattern light projected regions can be obtained. The subsequent processes are the same as those of the method described in the first embodiment, thus measuring the position and orientation of the object.

[Third Embodiment]

The method described in the first and second embodiments is the method of detecting edges while avoiding pattern light. The aforementioned error calculation method (to be referred to as a distance-priority error calculation method hereinafter) gives priority to pattern light detection, and has high detection precision of errors in the depth direction. By contrast, the method disclosed in patent literature 1 (to be referred to as an edge-priority error calculation method hereinafter) gives priority to edge detection, and is characterized by high detection precision of errors in a sensed image plane direction.

Based on these characteristics, a mechanism for discriminating, based on an object shape upon error calculations, whether the distance-priority error calculation method or the edge-priority error calculation method is adopted, is arranged, thus allowing measurements with higher precision. Practical examples of that discrimination criterion will be described below.

A first method is based on an object shape. Initially, sample points are evenly set in a volume of a three-dimensional geometric model of an object. Principal component analysis is applied to a set of these sample points to calculate contribution ratios of first, second, and third principal components (a ratio of each principal component to a sum of three principal components). Furthermore, relations and features of these contribution ratios are classified as follows.

1) First principal component contribution ratio>>second principal component contribution ratio→volume of object is distributed linearly 2) First principal component contribution ratio≈second principal component contribution ratio and second principal component contribution ratio>>third principal component contribution ratio→volume of object is distributed two-dimensionally 3) First principal component contribution ratio≈second principal component contribution ratio≈third principal component contribution ratio→volume of object is evenly distributed on three-dimensional space Note that a>>b indicates that $\underline{a}$ is greatly larger than b (a ratio of $\underline{a}$ to b is larger than a threshold).

When the relation of the principal component contribution ratios is 1) or 2) above and an object is placed on a measurement table having a flat face, the object is placed to extend along the face, and a distribution of an observation image depth direction tends to be small. On the other hand, when the relation of the principal component contribution ratios is 3), a distribution of the observation image depth direction of the object tends to be large.

Based on the above description, when the principal component contribution ratio satisfies the relation 3), and a volume distribution of a measurement target object is distributed widely in the observation image depth direction, the distance-priority error calculation method is adopted; otherwise, the calculation method is switched to adopt the edge-priority error calculation method. Note that the switching criterion of the error calculation method is merely an example, and a criterion which attaches importance on a spread in the image depth direction of the object can be used instead. That is, of the following two processes, one process decided according to a shape of model information is executed.

(Process 1) Processing for superimposing model information which simulates a shape of a target object onto an image, and searching for points of the target object corresponding to those of the superimposed model information from a region other than an enlarged region obtained by enlarging a region with pattern light in the image (Process 2) Processing for superimposing an edge model of model information onto an image, removing a region with pattern light in the image based on the edge model superimposed on the image, and then searching for points of a target object corresponding to those of the model information superimposed on the image from a region other than a region with pattern light in the image As a second method, a calculation method based on ambiguity of a position and orientation of an object at an approximate position and orientation in a depth direction may be used. According to the following literature, assuming that ambiguity of a pixel of an observation image is "1" for all pixels, a covariance matrix of ambiguities with respect to a direction at a certain approximate position and orientation is expressed by $J^T J$.

W. Hoff and T. Vincent "IEEE Trans. Visualization and Computer Graphics, Vol. 6, No. 4, 2000."

Letting u be a principal direction unit vector calculated by applying eigenvalue decomposition to this covariance matrix, the ambiguity of the position and orientation of the object at the approximate position and orientation in the depth direction can be expressed as an inner product of u and a depth direction unit vector. This value can assume a value ranging from 0 to 1, and represents that a position and orientation are ambiguous in the depth direction as that value is closer to 1. The calculation method of this value has been described in the first embodiment. When the calculated ambiguity is not less than a predetermined reference value, the distance-priority error calculation method is adopted; otherwise, the calculation method is switched to adopt the edge-priority error calculation method.

Using the switching criterion exemplified above, the error calculation method which considers the respective characteristics is adopted, thus allowing the position/orientation measurement with higher precision.

[Fourth Embodiment]

Figure 12:
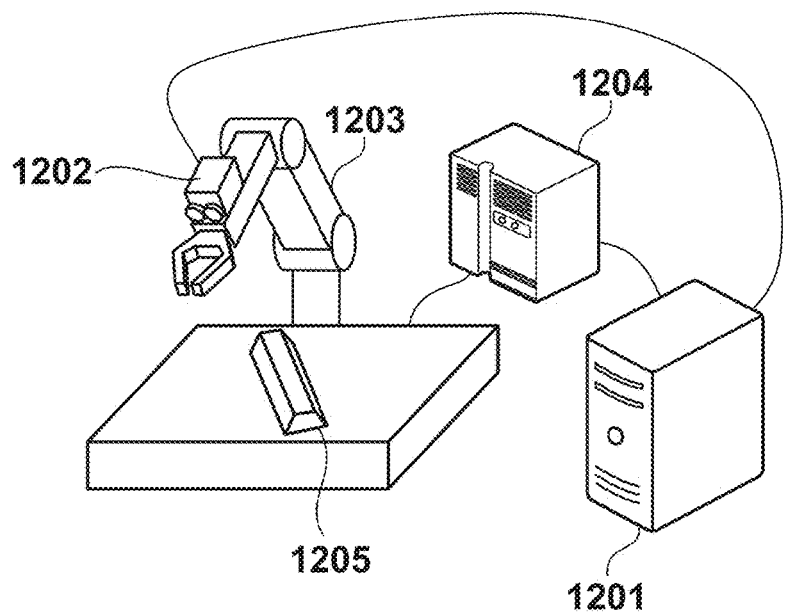
FIG. 12 is a view showing an arrangement example of a robot system.

The image processing apparatus of the first to third embodiments can be used as an apparatus for measuring a position and orientation of an object in a system (robot system) which grips, moves, and releases an object using an industrial robot arm. This application example will be described below with reference to FIG. 12.

A sensor 1202 is obtained by integrating an image sensing device 103 and projector 102 (they may be independently arranged). The sensor 1202 projects pattern light onto an object 1205 as a position/orientation measurement target, and senses an image of the object 1205 projected with the pattern light. This sensor 1202 is attached to a robot arm 1203, and can sense an image of the object 1205 to be gripped by the robot arm 1203.

The robot arm 1203 has a movable axis including a rotation axis and/or a translation axis, and is controlled by a robot controller 1204.

A computer 1201 functions as an image processing apparatus 104, and controls the robot controller 1204. The robot controller 1204 converts a control instruction (including a position and orientation of the object 1205) for the robot arm 1203 received from the computer 1201 into a practical control command, thus actuating the robot arm 1203.

The image processing apparatus 104 in this embodiment includes the following processing sequence in addition to the aforementioned sequence. Initially, the computer 1201 holds a relative relationship between a camera coordinate system and a robot coordinate system with reference to the robot arm 1203. The computer 1201 measures a position and orientation of the object 1205, and converts the measurement results from the camera coordinate system into the robot coordinate system. Next, the computer 1201 controls the robot controller 1204 to move the robot arm 1203 to a position and orientation at which the robot arm 1203 can grip the object 1205, based on the converted position and orientation of the object on the robot coordinate system.

Thus, the robot system of this embodiment can control the robot arm to grip an object by measuring a position and orientation of the object even when the position of the object is unstable.

Note that the image processing apparatus 104 is applicable to arbitrary systems as long as they are required to measure a position and orientation of an object as a position/orientation measurement target. In other words, a use purpose of the position and orientation calculated by the image processing apparatus 104 is not limited to a specific use purpose.

[Fifth Embodiment]

Respective units (position/orientation calculation unit 201, edge correspondence detection unit 205, and range image generation unit 206) included in the image processing apparatus 104 shown in FIG. 1 may be implemented by hardware, but they may be implemented by software (computer programs). In the latter case, in a memory accessible by a computer, the three-dimensional model information 202 and initial approximate position/orientation information 203 are stored as data, and the position/orientation calculation unit 201, edge correspondence detection unit 205, and range image generation unit 206 are stored as computer programs. Then, when a CPU of this computer reads out these computer programs and data and executes processing, this computer can function as the image processing apparatus 104.

<Effects of Embodiments>

According to the first embodiment, position/orientation measurements can be attained to have higher stability with respect to a surface shape and geometric shape of an object, and to have high precision especially for an object which is laid out to have a spread in an image depth direction.

According to the second embodiment, even when pattern light in a sensed image cannot be detected by image processing, correction association processing can be attained.

According to the third embodiment, by selecting the error calculation method based on an object shape or an object layout state, measurement precision can be enhanced.

According to the fourth embodiment, an object which is placed on an unstable portion can be gripped.

<Definition>

Pattern light in the above description need only specify a projected region boundary in a sensed image. For this reason, various projection devices can be applied to a device for projecting pattern light. That is, a device included in a system may actively project pattern light, or pattern light may be passively projected from an external device which cannot be controlled by the system. Also, a projected shape of pattern light is not particularly limited as long as its projected region boundary can be specified. The pattern light may have a slit shape, random dot pattern, or a local planar pattern. Alternatively, spot light may be projected.

The specifying method of each projected region of pattern light in a sensed image is not particularly limited. That is, as described in the first embodiment, the projected region may be specified based on a luminance value using a threshold or another color information as a threshold. Also, as described in the second embodiment, if the projected shape of pattern light is given, the projected region may be calculated and specified based on that shape, an approximate position and orientation of an object, and a geometric shape of the object.

Furthermore, the position/orientation calculation method in the above description is not particularly limited as long as a method is executed using an image with pattern light. For example, model fitting which decides three-dimensional position/orientation parameters of an object included in a sensed image based on an object three-dimensional model held in advance may be used. Alternatively, template matching which decides a position of a predetermined template included in a sensed image based on a template image held in advance may be used.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-137268 filed Jun. 18, 2012 which is hereby incorporated by reference herein in its entirety.

What is claimed is:

1. A system comprising:
a projector that irradiates a target object with pattern light in the form of slit light;
a camera that images the target object;
a memory storing a program; and
a processor that executes the program stored in the memory to act as units comprising:
(a) an image obtaining unit configured to obtain an image, imaged by the camera, of the target object projected with the slit light;
(b) a detection unit configured to detect, from the obtained image, a region projected with the slit light;
(c) an enlarging unit configured to enlarge the projected region in the obtained image;
(d) a search unit configured to search a region, which is a region in the obtained image except for the enlarged projected region, for image features of the target object; and
(e) a derivation unit configured to derive a position and an orientation of the target object, based on (1) a result of the searching of the region in the obtained image except for the enlarged projected region for image features of the target object and (2) a model of the object.

2. The system according to claim 1, wherein the search unit is configured to extract the image features, and to exclude image features of the enlarged projected region from the extracted image features.

3. The system according to claim 1, wherein the detection unit is configured to detect the region projected with the pattern based on whether a pixel value of each pixel in the obtained image is larger than a threshold.

4. The system according to claim 1, wherein the detection unit is configured to detect the region projected with the pattern based on (1) a position and orientation given as a position and orientation of the target object, (2) a geometric shape of the target object, and (3) a shape of the pattern.

5. The system according to claim 1, wherein the search unit defines the enlarged projected region in the obtained image as a pattern region, and generates a mask image.

6. The system according to claim 5, wherein the processor further executes the program stored in the memory to act as units comprising:

a range information generation unit configured to generate, from the pattern region, range information having distances from the image obtaining unit to positions on the target object,
wherein the derivation unit is configured to derive the position and orientation of the target object projected with the pattern in the obtained image, based on the result of the searching by the search unit, the detection result of the detection unit, and the range information.

7. The system according to claim 1, wherein the processor further executes the program stored in the memory to act as units comprising:
an output unit configured to output the position and the orientation derived by the derivation unit to a controller that is coupled to the output unit and which controls a robot arm which manipulates the target object.

8. The system according to claim 1, further comprising a holding unit configured to hold a model of the target object.

9. The system according to claim 1, further comprising:
an obtaining unit configured to obtain an approximate position and orientation of the target object;
wherein the search unit is configured to project the features of the model of the target object on the image obtained by the image obtaining unit based on the approximate position and orientation of the target object and to search for the image features corresponding to the projected features of the target object from the region in the obtained image except for the enlarged projected region.

10. The system according to claim 6, wherein the derivation unit is configured to derivate the position and orientation of the target object projected with the pattern in the obtained image by associating the image features of the target object searched for by the search unit with first features of a model of the target object and associating the range information with second features of the model of the target object.

11. The system according to claim 1, wherein the image obtaining unit obtains the image of the target object projected with the pattern by obtaining the image from an image sensor of the camera.

12. The system according to claim 1, wherein an apparatus comprising the memory and the processor is coupled to the camera.

13. The system according to claim 1, wherein an apparatus comprising the memory and the processor is coupled to the projector.

14. A method comprising:
irradiating, by a projector, a target object with pattern light in the form of slit light;
imaging, by a camera, the target object;
obtaining an image, imaged by the camera, of the target object projected with the slit light;
detecting, from the obtained image, a region projected with the slit light;
enlarging the projected region in the obtained image;
searching a region, which is a region in the obtained image except for the enlarged projected region, for image features of the target object; and
deriving a position and orientation of the target object, based on (1) a result of the searching of the region in the obtained image except for the enlarged projected region for image features of the target object and (2) a model of the object.

15. A non-transitory computer-readable storage medium storing a computer program for causing a computer to execute a method comprising:

irradiating, by a projector, a target object with pattern light in the form of slit light;

imaging, by a camera, the target object;

obtaining an image, imaged by the camera, of the target object projected with the slit light;

detecting, from the obtained image, a region projected with the slit light;

enlarging the projected region in the obtained image;

searching a region, which is a region in the obtained image except for the enlarged projected region, for image features of the target object; and deriving a position and orientation of the target object, based on (1) a result of the searching of the region in the obtained image except for the enlarged projected region for image features of the target object and (2) a model of the object.

16. A system comprising:

a projector that irradiates a target object with pattern light in the form of slit light;

a camera that images the target object;

a memory storing a program; and a processor that executes the program stored in the memory to act as units comprising:

(a) an image obtaining unit configured to obtain an image, imaged by the camera, of the target object projected with the slit light;

(b) a detection unit configured to detect, from the obtained image, a region projected with the slit light;

(c) a generation unit configured to generate a mask region which masks the projected region and to enlarge the mask region in the obtained image;

(d) a search unit configured to search a region, which is a region in the obtained image except for the enlarged mask region, for image features of the target object; and (e) a derivation unit configured to derive a position and orientation of the target object, based on (1) a result of the searching of the region in the obtained image except for the enlarged mask region for image features of the target object and (2) a model of the object.

17. The system according to claim 16, wherein the processor further executes the program stored in the memory to act as units comprising:

a range information generation unit configured to generate range information of the target object;

wherein the derivation unit derives the position and orientation of the target object projected with the pattern in the obtained image, based on the result of the searching and the range information generated by the range information generation unit.

18. The system according to claim 16, wherein the generation unit generates, as the mask region, a mask image by allocating a first value to a pixel corresponding to the projected region and allocating a second value different from the first value to a pixel corresponding to the region except for the projected region.

19. The system according to claim 16, wherein the detection unit detects, in the obtained image, the region projected with the pattern, based on an approximate position and orientation of the target object.

20. The system according to claim 16, wherein the detection unit detects, in the obtained image, the region projected with the pattern, based on whether a pixel value of each pixel in the obtained image is larger than a threshold.

21. A method comprising:

irradiating, by a projector, a target object with pattern light in the form of slit light;

imaging, by a camera, the target object;

obtaining an image, imaged by the camera, of the target object projected with the slit light;

detecting, from the obtained image, a region projected with the slit light;

generating a mask region which masks the projected region and enlarging the mask region in the obtained image;

searching a region, which is a region in the obtained image except for the enlarged mask region, for image features of the target object; and deriving a position and orientation of the target object, based on (1) a result of the searching of the region in the obtained image except for the enlarged mask region for image features of the target object and (2) a model of the object.

22. A non-transitory computer-readable storage medium storing a computer program for causing a computer to execute a method comprising:

irradiating, by a projector, a target object with pattern light in the form of slit light;

imaging, by a camera, the target object;

obtaining an image, imaged by the camera, of the target object projected with the slit light;

detecting, from the obtained image, a region projected with the slit light;

generating a mask region which masks the projected region and enlarging the mask region in the obtained image;

searching a region, which is a region in the obtained image except for the enlarged mask region, for image features of the target object; and deriving a position and orientation of the target object, based on (1) a result of the searching of the region in the obtained image except for the enlarged mask region for image features of the target object and (2) a model of the object.

* * * * *